(12) United States Patent
Mareno

(10) Patent No.: US 8,688,176 B2
(45) Date of Patent: Apr. 1, 2014

(54) COMPONENTS WITH MECHANICALLY-BONDED PLASTIC AND METHODS FOR FORMING SUCH COMPONENTS

(75) Inventor: Jason Donald Mareno, Raleigh, NC (US)

(73) Assignee: HTC Corporation, Taoyuan (TW)

( * ) Notice: Subject to any disclaimer, the term of this patent is extended or adjusted under 35 U.S.C. 154(b) by 104 days.

(21) Appl. No.: 13/370,526

(22) Filed: Feb. 10, 2012

(65) Prior Publication Data

US 2013/0210504 A1    Aug. 15, 2013

(51) Int. Cl.
*H04B 1/38*    (2006.01)

(52) U.S. Cl.
USPC .................. 455/575.1; 455/575.7; 455/575.8; 455/90.3; 455/347; 361/807; 361/810

(58) Field of Classification Search
USPC ............... 455/575.1, 575.7, 575.8, 90.3, 347; 361/807, 810
See application file for complete search history.

(56) References Cited

U.S. PATENT DOCUMENTS

| | | | |
|---|---|---|---|
| 6,201,867 B1 * | 3/2001 | Koike | 379/433.11 |
| 2009/0017242 A1 | 1/2009 | Weber et al. | |
| 2010/0097276 A1 | 4/2010 | Lin et al. | |
| 2010/0146766 A1 * | 6/2010 | Dabov et al. | 29/428 |
| 2012/0063115 A1 * | 3/2012 | Prest et al. | 361/810 |

FOREIGN PATENT DOCUMENTS

| | | |
|---|---|---|
| EP | 1887650 A1 | 2/2008 |
| EP | 1918800 A1 | 5/2008 |
| EP | 1919267 A1 | 5/2008 |
| EP | 2629495 A1 | 8/2013 |
| JP | 2005-010699 A | 1/2005 |
| JP | 2009-139958 A | 6/2009 |

OTHER PUBLICATIONS

Germany Office Action dated Oct. 10, 2013.
English translation of abstract of JP 2009-139958 A (published Jun. 25, 2009).
English translation of abstract of JP 2005-010699 A (published Jan. 13, 2005).
English translation of abstract of EP 1887650 A1 (published Feb. 13, 2008).

* cited by examiner

*Primary Examiner* — Tuan Pham
(74) *Attorney, Agent, or Firm* — McClure, Qualey & Rodack, LLP

(57) ABSTRACT

Components and methods for forming such components with mechanically-bonded plastic are provided. A representative method includes: providing a metal chassis, the chassis having an opening extending through; placing the chassis in a mold; flowing plastic into the mold such that the plastic flows into the opening, the plastic being mechanically bonded to the metal of the chassis to form an integrated metal and plastic component; and removing the integrated metal and plastic component from the mold.

19 Claims, 5 Drawing Sheets

COMPONENTS WITH MECHANICALLY-BONDED PLASTIC AND METHODS FOR FORMING SUCH COMPONENTS

TECHNICAL FIELD

The present disclosure generally relates to components with mechanically bonded plastic.

BACKGROUND

Various devices such as mobile devices (e.g., smartphones, handheld GPS devices, etc.) trend toward the characteristics of small size and light weight. This is particularly the case with housings of such devices. However, it is difficult to reduce the weight of such devices without reducing desirable mechanical properties, such as resistance to torsional loads.

SUMMARY

Briefly described, one embodiment, among others, is a mobile device that incorporates a housing, wherein the housing comprises: a metal chassis having an opening extending there through; and a plastic part mechanically bonded to the metal of the chassis and spanning the opening.

Another embodiment is a method for forming a component comprising: providing a metal chassis, the chassis having an opening extending through; placing the chassis in a mold; flowing plastic into the mold such that the plastic flows into the opening, the plastic being mechanically bonded to the metal of the chassis to form an integrated metal and plastic component; and removing the integrated metal and plastic component from the mold.

Another embodiment comprises a component formed by a disclosed method.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
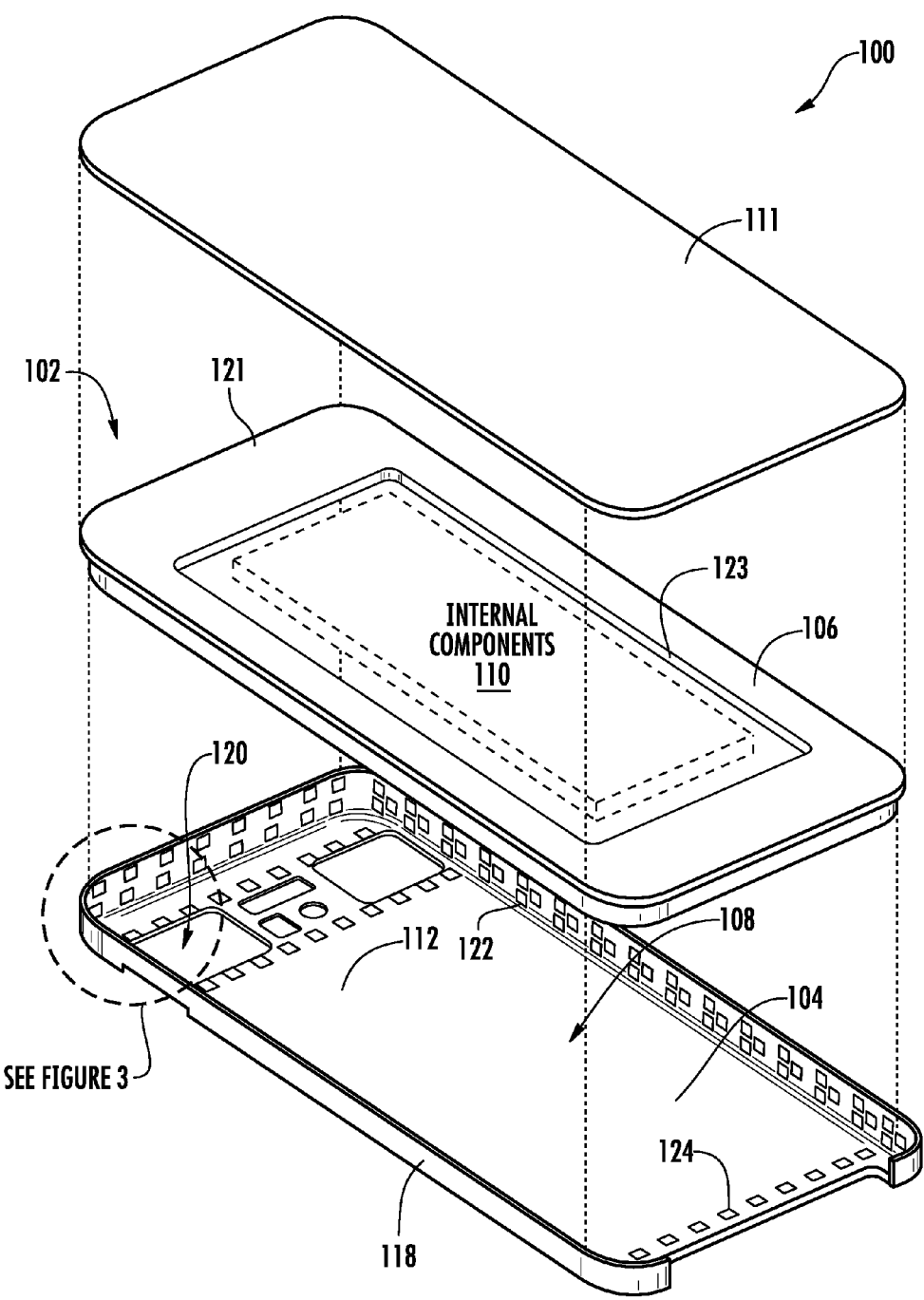
FIG. 1 is a partially-exploded, schematic view of an example embodiment of a mobile device that incorporates a component with mechanically-bonded plastic.

Having summarized various aspects of the present disclosure, reference will now be made in detail to that which is illustrated in the drawings. While the disclosure will be described in connection with these drawings, there is no intent to limit the scope of legal protection to the embodiment or embodiments disclosed herein. Rather, the intent is to cover all alternatives, modifications and equivalents included within the spirit and scope of the disclosure as defined by the appended claims.

Components with mechanically-bonded plastic and methods for forming such components are provided. In some embodiments, recesses are formed in a metal chassis and then the chassis is placed in a mold. Plastic is flowed into the mold and portions of the plastic enter the recesses prior to solidifying. The flow portions positioned within the recesses create firm mechanical bonds that allow the integrated metal and plastic component that is created to exhibit light weight and high structural rigidity. In some embodiments, the components are associated with mobile devices. By way of example, such a component could be configured as a housing for a smartphone.

A description of an embodiment of a component will now be described. In this regard, FIG. 1 is a partially-exploded, schematic view of an example embodiment of a mobile device that incorporates a component with mechanically-bonded plastic. As shown in FIG. 1, mobile device 100 includes a component with mechanically-bonded plastic 102 that is configured as a housing. The housing incorporates a metal chassis 104 and a plastic part 106. Although shown exploded away from the chassis, the plastic part is mechanically bonded to the chassis as will be described in detail later.

The housing defines an interior 108 in which internal components 110 (the details of which are not described herein) are mounted. A platen 111 (e.g., a glass platen), which can be a portion of a display module, is attached to the housing so that the housing and the platen form a substantial portion of the exterior surfaces of the mobile device.

The chassis incorporates a base 112 and a sidewall 118 positioned about the periphery of the base that extends outwardly therefrom. Additionally, openings (e.g., opening 120) extend through the chassis. As is known, an opening tends to decrease the structural integrity of the chassis, with the size of the opening generally directly relating to the degree of degradation of mechanical properties.

In order to enhance the structural integrity of the housing, the plastic part is integrated with the metal chassis. In this embodiment, the plastic part spans the width and length of the chassis to form a rigid torque box. Specifically, the plastic part incorporates a body 121 from which various flow portions (e.g., flow portion 152 of FIG. 3) extend. In this case, the body is generally rectangular and includes an aperture 123 for facilitating the placement of internal components 110.

Recesses (e.g., recesses 122, 124) are positioned about the chassis to form bonding locations for the plastic part. In this embodiment, the recesses are formed by chemically etching the recesses into the surface of the chassis using a process known as Nano Molding Technology (NMT). In other embodiments, various other forms of direct metal-to-plastic bonding techniques can be used. For instance, in other embodiments, other methods for forming recesses can be used. Additionally, or alternatively, various adhesion methods, such as selective surface application of adhesive primer on a chassis can be performed prior to introducing plastic into the mold, among others.

In FIG. 1, the recesses are arranged about various features of the chassis, such as about the openings and the periphery. The recesses form the bonding locations at which the plastic part mechanically bonds to the metal of the chassis. In this embodiment, various ones of the recesses are oriented in opposing relationships. By way of example, there are recesses that face each other across the width of the base.

Figure 2:
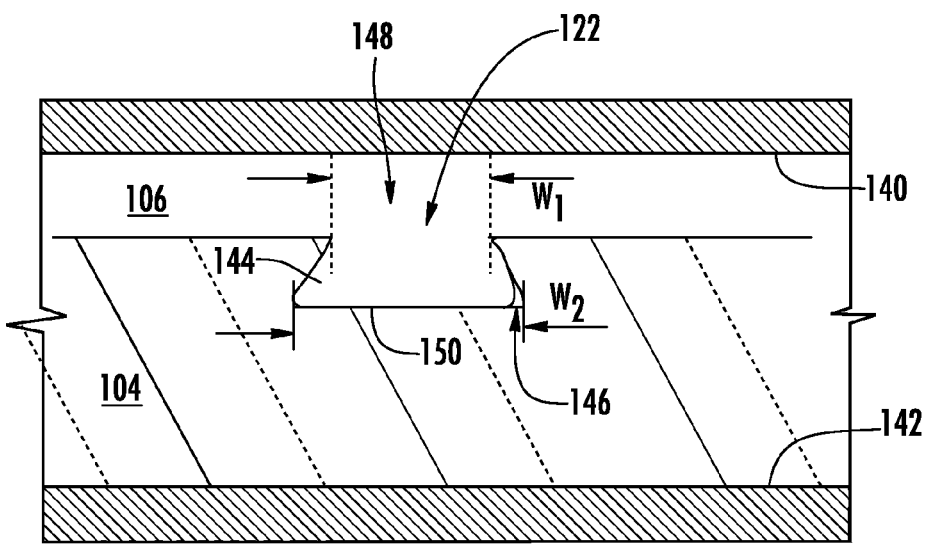
FIG. 2 is a partially cut-away, cross-sectional view of the embodiment of FIG. 1 showing detail of a flow portion of the plastic part and a corresponding recess.

FIG. 2 is a partially cut-away, cross-sectional view of the embodiment of FIG. 1 showing detail of recess 122 in an assembled configuration. As shown in FIG. 2, the housing is positioned within a mold that includes mold surfaces 140, 142. Plastic is flowed into the mold and a flow portion 144 of the plastic part enters the recess where it is permitted to harden. Preferably, a viscosity of the plastic is selected to enable the plastic to completely fill the recess although some voids (e.g., void 146) may be present.

In this embodiment, the recesses exhibit necked regions that essentially form interference fits with respective flow portions of the plastic part. For instance, recess 122 exhibits a width that varies with respect to its depth to form a necked region 148 with a width ($w_1$) that is narrower than the width ($w_2$) of base 150. In other embodiments, various other dimensions of recesses can be used, including those that do not exhibit necked portions.

Figure 3:
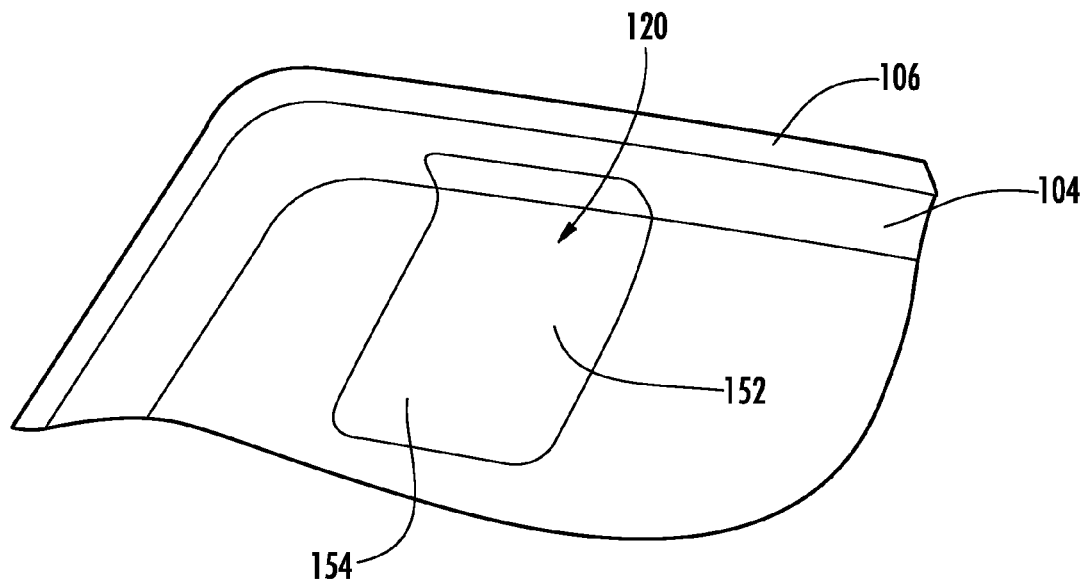
FIG. 3 is a partially cut-away view of the embodiment of FIG. 1 showing detail of an exposed surface of the plastic part.

FIG. 3 is a partially cut-away view of the embodiment of FIG. 1 showing detail of an exposed surface of plastic part 106. Specifically, shown in FIG. 3 is a portion of the chassis with a flow portion 152 of the plastic part filling opening 120 of the chassis. Note that the exposed surface 154 of the plastic part is flush with the surrounding surface of the chassis and that the periphery of the plastic flow portion conforms to the aperture that defines opening 120.

Figure 4:
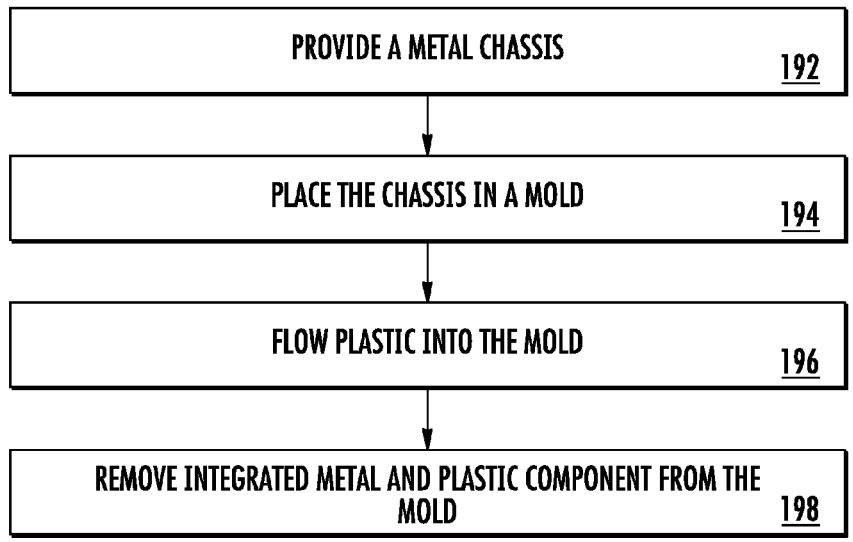
FIG. 4 is a flowchart depicting an example embodiment of a method for forming a component.

FIG. 4 is a flowchart depicting an example embodiment of a method for forming a component. As shown in FIG. 4, the method includes the steps of: providing a metal chassis, the chassis having an opening extending through (block 192); placing the chassis in a mold (block 194); flowing plastic into the mold such that the plastic flows into the opening, the plastic being mechanically bonded to the metal of the chassis to form an integrated metal and plastic component (block 196); and removing the integrated metal and plastic component from the mold (block 198).

Figure 5:
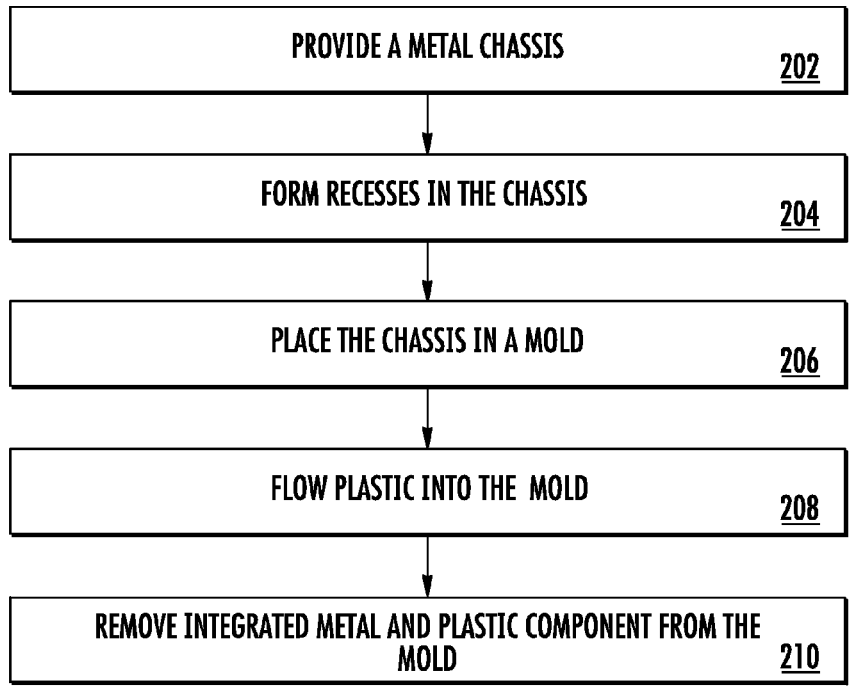
FIG. 5 is a flowchart depicting another example embodiment of a method for forming a component.

FIG. 5 is a flowchart depicting another example embodiment of a method for forming a component. As shown in FIG. 5, the method includes the steps of: providing a metal chassis with an opening extending there through (block 202); forming recesses in the chassis, with at least some of the recesses being positioned about the opening (block 204); and placing the chassis in a mold (block 206). Thereafter, such as depicted in block 208, plastic is flowed into the mold (e.g., injected) so that the plastic flows into the recesses and the opening to form an integrated metal and plastic component. Notably, the plastic is mechanically bonded to the metal of the chassis via flow portions formed within the recesses. In block 210, the integrated metal and plastic component is removed from the mold.

Figure 6:
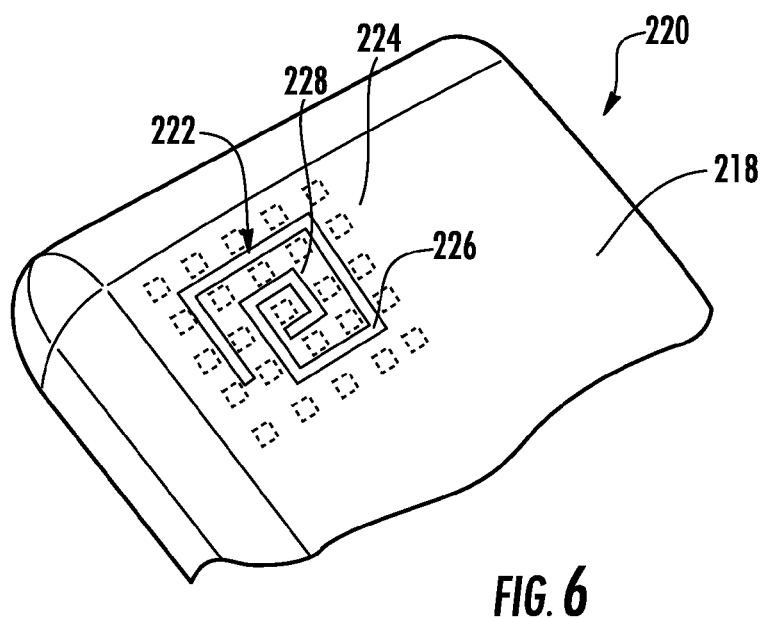
FIG. 6 is a partially cut-away view of another example embodiment of a component.

FIG. 6 is a partially cut-away view of another example embodiment of a component. As shown in FIG. 6, a surface 218 of component 220 includes an opening 222 formed in metal chassis 224. The opening is occupied by a flow portion 226 of a plastic part, which has been formed in a manner similar to that described before. Notably, the configuration of the opening results in a finger 228 of the material of the chassis that is surrounded by the plastic part that enables the finger to function as an antenna. For instance, antenna can be for a mobile device. Also, note that the dashed lines depict representative recesses formed on the underside of the chassis.

Figure 7:
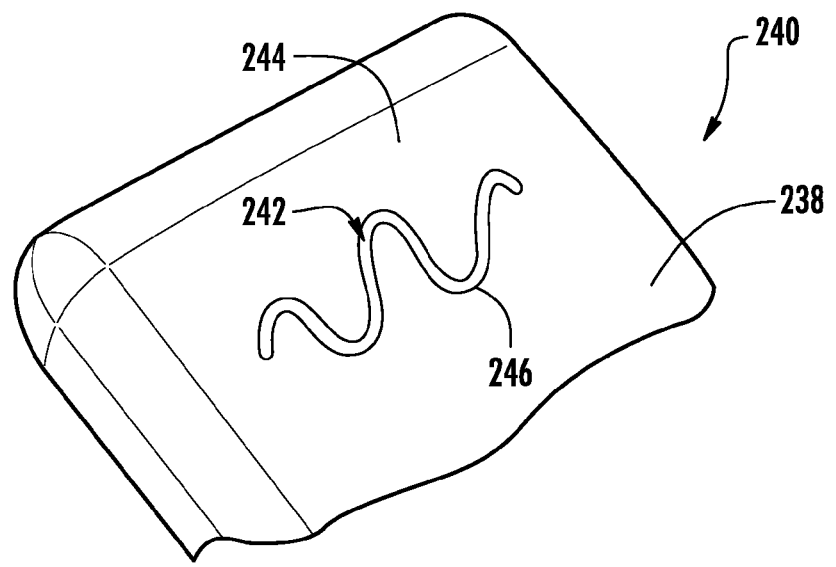
FIG. 7 is a partially cut-away view of another example embodiment of a component.

FIG. 7 is a partially cut-away view of another example embodiment of a component. As shown in FIG. 7, a surface 238 of component 240 includes an opening 242 formed in metal chassis 244. The opening is occupied by a flow portion 246 of a plastic part, which has been formed in a manner similar to that described before. Notably, the configuration of the opening results in a surface feature that can be arbitrary in shape, contrasting in material, color or texture, and/or ornamental in nature.

Figure 8:
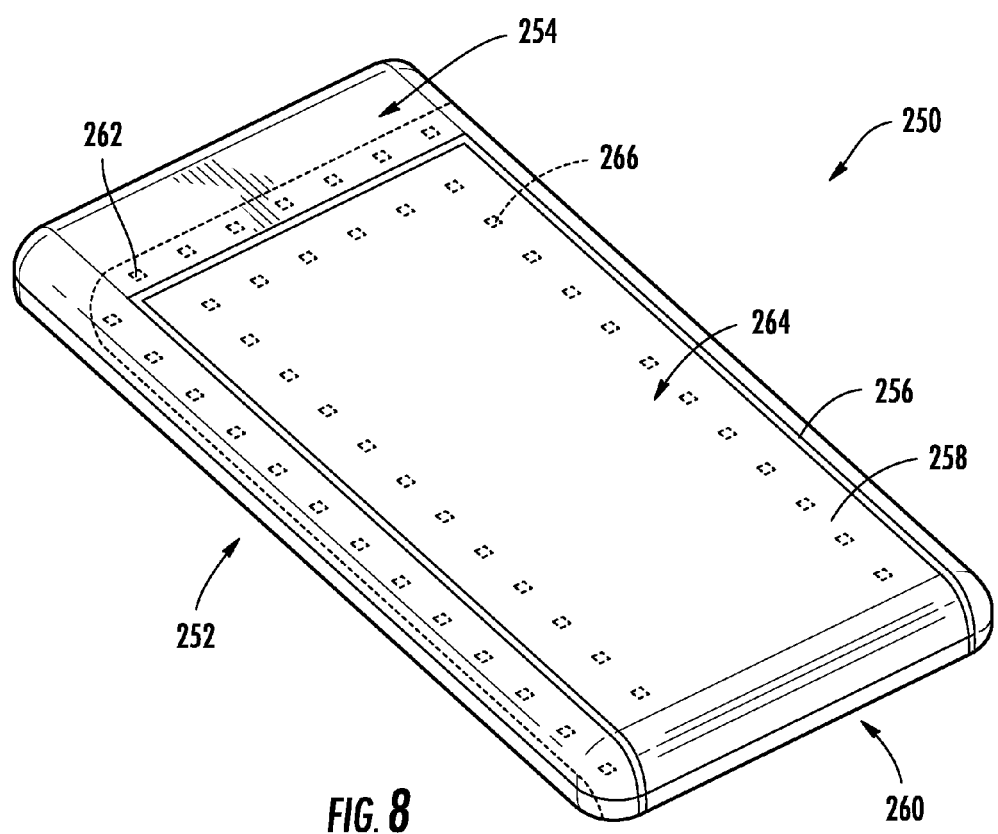
FIG. 8 is a schematic view of another example embodiment of a mobile device.

FIG. 8 is a schematic view of another example embodiment of a mobile device. As shown in FIG. 8, mobile device 250 includes a component with mechanically-bonded plastic 252 that is configured as a housing. In this embodiment, the housing incorporates a metal chassis 254, a plastic part 256 and an insert 258, which also is formed of metal.

Chassis 254 defines an opening 260 about which recesses (e.g., recess 262) are formed. The recesses are sized and shaped to receive flow portions of the plastic part during a forming process. The plastic part spans the opening and provides a cavity 264 on its outer surface for receiving the insert. Insert 258 also incorporates recesses (e.g., recess 266), which are used for receiving corresponding flow portions of the plastic part.

In this regard, the plastic part serves a dual purpose of affixing the position of the insert with respect to the chassis and electrically isolating the insert from the chassis. By using a technique such as that embodied in the example of FIG. 8, the metal chassis and insert can be formed separately and may exhibit different treatments, and then may be assembled with the plastic part to form an integrated component.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A mobile device comprising:
a housing comprising:
a metal chassis having an opening extending through the metal chassis; and
a plastic part mechanically bonded to the metal chassis and configured to extend across the opening;
wherein the metal chassis has a first set of recesses positioned about the opening; and the plastic part is mechanically bonded to the metal chassis via flow portions of the plastic part positioned within the first set of recesses.

2. The mobile device of claim 1, further comprising a first component mounted to the plastic part, the first component being electrically isolated from the metal chassis.

3. The mobile device of claim 2, wherein:
the first component forms a portion of the housing;
the plastic part defines a cavity; and
the first component is positioned within the cavity such that the plastic part is positioned, at least partially, between the first component and the metal chassis.

4. The mobile device of claim 1, wherein a portion of the metal chassis surrounding the opening defines an antenna.

5. The mobile device of claim 1, wherein at least one pair of recesses of the first set of recesses are formed in opposing side walls of the metal chassis and are oriented in an opposing relationship such that the at least one pair of recesses face each other.

6. The mobile device of claim 1, wherein a first one of the first set of recesses exhibits a width that varies with respect to its depth such that the first one of the first set of recesses exhibits a necked region.

7. The mobile device of claim 1, wherein an exposed surface of the plastic part is flush with a surrounding surface of the metal chassis.

8. The mobile device of claim 1, wherein the opening in the metal chassis is defined by an aperture, and wherein a periphery of the plastic part extends across the opening and conforms to the aperture.

9. The mobile device of claim 1, wherein the mobile device is a smartphone.

10. A housing of a portable device, the housing comprising:
a metal chassis including a base and an aperture, wherein the aperture extends through the base of the metal chassis, and wherein the base includes inside edges defining the aperture; and
a plastic part mechanically bonded to the metal chassis, wherein at least a portion of the plastic part contacts the inside edges of the base and substantially fills the aperture.

11. The housing of claim 10, wherein the plastic part is mechanically bonded to the metal chassis to form an integrated component.

12. The housing of claim 10, wherein the plastic part is mechanically bonded to the metal chassis by molding fluidic plastic to the metal chassis.

13. The housing of claim 10, further comprising a metallic component mounted within a cavity of the plastic part and electrically isolated from the metal chassis.

14. The housing of claim 10, wherein the aperture includes a serpentine pattern and a portion of the base surrounding the aperture defines an antenna.

15. The housing of claim 10, wherein the metal chassis further includes at least one recess formed beside the aperture, and wherein at least one portion of the plastic part substantially fills the at least one recess.

16. The housing of claim 15, wherein a deep portion of the at least one recess has a greater width than a shallow portion of the recess.

17. The housing of claim 10, wherein the metal chassis further includes side walls connected to the base.

18. The housing of claim 17, wherein the metal chassis further includes at least one pair of recesses in the side walls, each pair of recesses being formed in opposing side walls and oriented to substantially face each other.

19. The housing of claim 10, wherein an exposed surface of the plastic part is flush with a surrounding surface of the metal chassis.

* * * * *